United States Patent
Fukuzawa et al.

[11] Patent Number: 5,063,470
[45] Date of Patent: Nov. 5, 1991

[54] INFORMATION SIGNAL REPRODUCING APPARATUS CAPABLE OF GRASPING REPRODUCING POSITION ON A TAPE-SHAPED RECORDING MEDIUM

[75] Inventors: Keiichi Fukuzawa; Yoshiki Ishii, both of Kanagawa, Japan

[73] Assignee: Canon Kabushiki Kaisha, Tokyo, Japan

[21] Appl. No.: 377,537

[22] Filed: Jul. 10, 1989

[30] Foreign Application Priority Data

Jul. 18, 1988 [JP] Japan .................. 63-177185

[51] Int. Cl.$^5$ .................. G11B 15/00; G11B 27/2
[52] U.S. Cl. .................. 360/137; 360/13; 360/14.1
[58] Field of Search .................. 360/14.1, 14.2, 14.3, 360/72.1, 72.2, 13, 137; 369/32, 53

[56] References Cited

U.S. PATENT DOCUMENTS

| | | | |
|---|---|---|---|
| 4,172,231 | 10/1979 | d'Arc et al. | 360/72.3 |
| 4,340,916 | 7/1982 | Menezes | 360/72.2 |
| 4,467,371 | 8/1984 | Kobayashi | 360/14.3 |
| 4,628,377 | 12/1986 | Harigaya | 360/72.1 |
| 4,727,417 | 2/1988 | Kanno et al. | 360/14.2 |
| 4,768,105 | 8/1988 | Aoui | 360/70 |
| 4,959,735 | 9/1990 | Kawai | 360/137 |
| 4,963,999 | 10/1990 | Utsunomiya et al. | 360/137 |
| 4,972,288 | 11/1990 | Nishida | 360/137 |
| 4,996,611 | 2/1991 | Ito | 360/137 |

*Primary Examiner*—Stuart S. Levy
*Assistant Examiner*—Tan Nguyen
*Attorney, Agent, or Firm*—Robin, Blecker, Daley & Driscoll

[57] ABSTRACT

An information signal recording and/or reproducing apparatus is arranged to designate first and second positions of a tape-shaped recording medium, to store first information concerned with a time interval between the first and second positions, to detect the position on the tape-shaped recording medium of an information signal recording and/or reproducing device, to obtain second information concerned with a time interval between the detected position and the first position, to compute a ratio between the first information and the second information, and to display the result of computation.

10 Claims, 8 Drawing Sheets

FIG.8

| i | $D_T$ | $D_L$ |
|---|---|---|
| 0 | $T_S$ | $D_L(0)$ |
| 1 | $D_T(1)$ | $D_L(1)$ |
| 2 | $D_T(2)$ | $D_L(2)$ |
| ⋮ | ⋮ | ⋮ |
| n−1 | $D_T(n-1)$ | $D_L(n-1)$ |
| n | $D_T(n)$ | $D_L(n)$ |
| n+1 | $T_e$ | $\Sigma D_L(i)$ |

INFORMATION SIGNAL REPRODUCING APPARATUS CAPABLE OF GRASPING REPRODUCING POSITION ON A TAPE-SHAPED RECORDING MEDIUM

BACKGROUND OF THE INVENTION

1. Field of the Invention

This invention relates to an information signal recording and/or reproducing apparatus of the kind using a tape-shaped recording medium and more particularly to an apparatus of that kind capable of accurately detecting a current information signal recording and/or reproducing position on the tape-shaped recording medium.

2. Description of the Related Art

In performing an automatic editing operation with magnetic recording and/or reproducing apparatuses by synchronizing two magnetic tapes which are employed as recording media (hereinafter referred to as tapes), the operation is generally carried out using data indicating the absolute addresses of time codes or the like which are recorded on both the tape used for signal transmission and the tape used for record editing.

The procedures for automatic editing are as follows: A reproducing or searching action or the like is first performed on the transmitting-side tape. A time code Ts for the start point of an image to be recorded by automatic editing is read out. At the same time, another time code Te for the end point of the image to be recorded is also read out. Meanwhile, a reproducing or searching action or the like is performed also on the record-editing-side tape to read out time codes Ts' and Te' for the start and end points of recording. Generally, it suffices to set three of the four time codes Ts, Te, Ts' and Te'.

Next, automatic editing is performed by synchronizing the two tapes on the basis of the time codes Ts, Te, Ts' and Te' to have a desired video signal recorded in a desired place. The automatic editing includes the following steps: The time codes Ts and Ts' which are start points of the two tapes are first read out. Then, the tapes are rewound to an extent corresponding to several frames. A reproducing action is performed on the tapes from the rewound points to the start points. During this process, the two tapes are synchronized. When the two tapes reach the start points, the transmission side is set into a reproducing mode and the record editing side into a recording mode for record editing. Further, when the time codes for the end points are read out, the record editing side is shifted back to the reproducing mode while the transmission side is left in the reproducing mode. Then, after a reproducing process is allowed to continue for several frames, the two tapes are brought to a stop to complete the automatic editing operation.

In most cases, a pre-confirming action is performed to ensure correct setting for automatic editing prior to automatic editing and a post-confirming action to ensure completion of automatic editing. For the pre-confirmation, the record editing side is left in the reproducing mode without being changed to the recording mode while the tapes are allowed to travel in the same manner as in the above-stated automatic editing action. For the post-confirmation, the record editing side is alone caused to act in the same manner as in the automatic editing action although it remains in the reproducing mode without being changed to the recording mode.

For detecting the degree of progress of the automatic editing action, either the time codes which are read out any time as desired are arranged to be displayed as they are, or a lap time from the start point is arranged to be measured and displayed by the apparatus.

The conventional magnetic recording and/or reproducing apparatus has the following shortcomings because of the arrangement to read out and display the time codes recorded on the tape or to display the lap time measured on the side of the apparatus:

It is difficult to instantly find the degree of progress of the automatic editing process within an initially set editing range. It is impossible to find the state of progress of the automatic editing particularly in cases where the time codes are inconsecutive within the set range.

In cases where weight is given to an important part of the tape by slowly moving the part while unimportant parts of the tape are quickly moved either forward or backward, the lap time display is hardly usable as reliable data for judging the degree of progress of the automatic editing operation.

SUMMARY OF THE INVENTION

It is a general object of this invention to solve the above-stated problems of the prior art.

It is a more specific object of the invention to provide an information signal recording and/or reproducing apparatus which permits instantaneous detection of the current recording or reproducing position of the signal within a designated range on a recording medium.

Under this object, an information signal recording and/or reproducing apparatus arranged as an embodiment of this invention comprises: recording and/or reproducing means for recording and or reproducing an information signal on and/or from a tape-shaped recording medium; designating means for designating first and second positions on the tape-shaped recording medium; first means for generating first information concerned with a time interval between the first and second positions; second means for generating second information concerned with a time interval between a position of the recording and/or reproducing means on the tape-shaped recording medium and the first position; third means for computing third information concerned with a ratio between the first information and the second information; and display means for displaying the third information.

It is another object of the invention to provide an information signal recording and/or reproducing apparatus which is capable of accurately detecting a time interval between two positions even in cases where time codes are inconsecutively recorded on a recording medium.

Under that object, an information signal recording and/or reproducing apparatus arranged as another embodiment of this invention comprises: recording and/or reproducing means for recording and/or reproducing an information signal on and/or from a tape-shaped recording medium; time information reproducing means for reproducing time information recorded on the tape-shaped recording medium; detecting means for detecting an inconsecutive point of the time information reproduced by the time information reproducing means; extracting means for extracting parts of the time information reproduced immediately before and immediately after the inconsecutive point in response to detection of the inconsecutive point by the detecting means;

first means for computing first information indicative of a difference between the part of the time information reproduced immediately before the inconsecutive point and a part of time information reproduced immediately after a past inconsecutive point; second means for computing second information indicative of a difference between the part of the time information reproduced immediately after the inconsecutive point and a part of time information currently reproduced; and third means for obtaining third information by adding together the first information and the second information.

Other objects and features of the invention will become apparent from the following detailed description of embodiments thereof taken in conjunction with the accompanying drawings.

BRIEF DESCRIPTION OF THE DRAWINGS

FIG. 8 shows data stored within a memory of the VTR of FIG. 4.

DETAILED DESCRIPTION OF THE PREFERRED EMBODIMENTS

Figure 1:
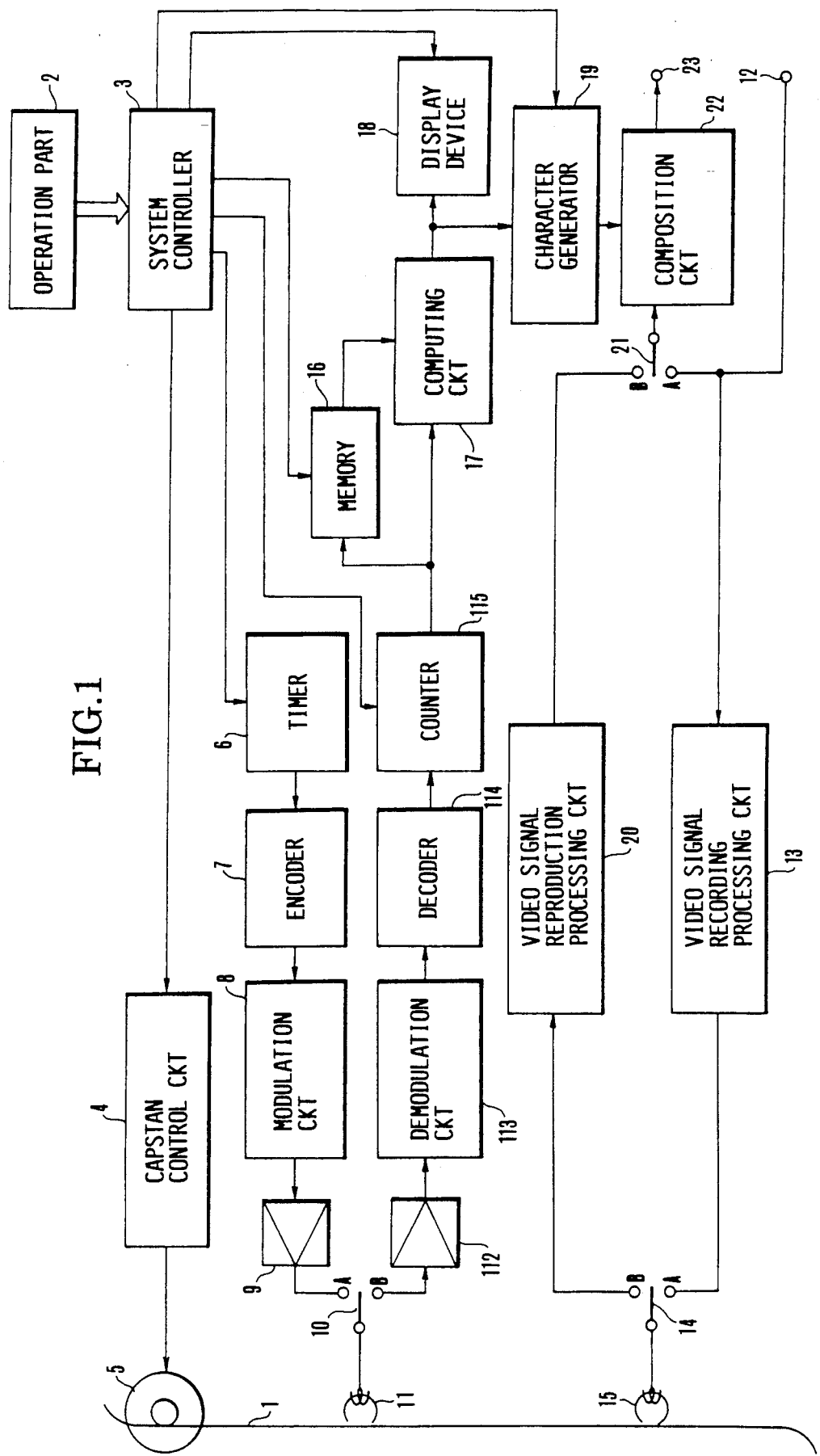
FIG. 1 is a block diagram showing in outline the arrangement of a video tape recorder (hereinafter referred to as a VTR) arranged as an embodiment of this invention.

The following describes by way of example some embodiments of this invention:

FIG. 1 shows in outline the arrangement of a VTR embodying the invention. The illustration includes a magnetic tape 1; a manual operation part 2 which is provided for setting the operation mode of the VTR; and a system controller 3 which is arranged to control the whole VTR according to the operation performed on the operation part 2. The operation of the VTR in each mode is as follows:

In a recording mode, the VTR operates as follows: Upon receipt of an instruction for recording from the operation part 2, each of the connecting positions of switches 10, 14 and 21 is shifted to one side A thereof. A video signal supplied from a terminal 12 is processed by a video signal recording processing circuit 13 into a signal form suited for magnetic recording. The video signal thus processed is supplied via a terminal A of the switch 14 to a rotary magnetic head 15. The head 15 then records the signal on the magnetic tape 1.

A timer 6 measures the lapse of time from the start of recording and produces data indicating the time measured. The time data thus obtained is encoded by an encoder 7 into a time code. The time code is supplied to a modulation circuit 8 to be modulated there. The modulated time code is supplied to a recording amplifier 9 and then to a fixed magnetic head 11 via a terminal A of the switch 10. The head 11 then records the time code on the magnetic tape 1.

Figure 2:
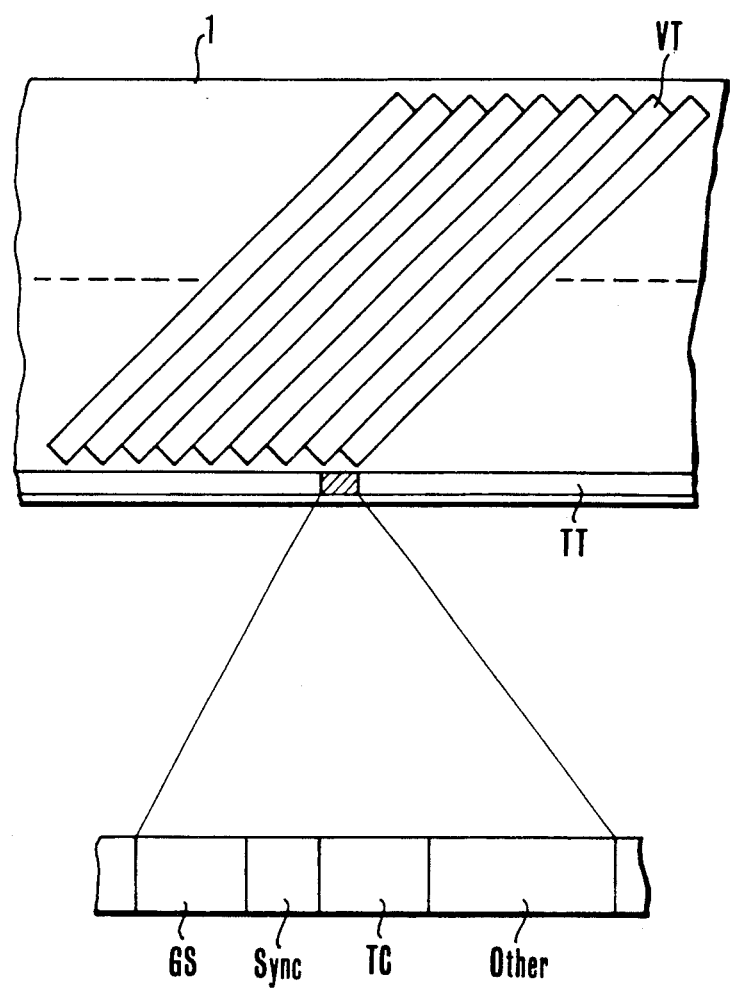
FIG. 2 shows a recording pattern formed by the VTR of FIG. 1.

The system controller 3 then causes a capstan control circuit 4 to have a capstan 5 rotated at a given constant speed. This causes the magnetic tape 1 to travel at the given speed. The video signal and the time code are thus recorded on the magnetic tape 1 in a pattern which is as shown in FIG. 2. In FIG. 2, a reference numeral 1 denotes the magnetic tape. A reference symbol VT denotes helical video tracks formed by the rotary head 15. A symbol TT denotes a time code track formed by the fixed head 11.

In the time code track TT, a part indicated by hatching represents an area where a unit of the time code is recorded. The lower part of FIG. 2 shows in detail the data allocation within this area. A symbol GS denotes a guard space; a symbol Sync denotes a synchronizing code; a symbol TC denotes the time code; and a symbol "Other" denotes other codes such as a redundant code, etc.

In editing, the VTR operates as follows: The connecting position of the switch 10 is always on the other side B thereof in this instance. In a case where the VTR is to be used as a VTR on the signal transmitting side, the positions of the switches 14 and 21 are on their sides B. If the VTR is to be used as a VTR on the record editing side, these switches 14 and 21 are on their sides A. However, in performing a pre-confirming action or a post-confirming action, the positions of the switches 14 and 21 are on the sides B even with the VTR used on the record editing side.

In a case where the VTR is used on the record editing side, the switch 21 allows the video signal which is supplied from the terminal 12 to be output as it is. In the other case, the switch 21 outputs a video signal which has been reproduced by the rotary head 15 and brought back to its original signal form by a video signal reproduction processing circuit 20. The signal output from the switch 21 is supplied to a composition circuit 22 as a monitoring signal. The composition circuit 22 then combines the signal with a character signal which will be described later. A composite signal thus obtained is output from an output terminal 23 which is provided for a monitor.

In editing, the VTR processes the time code in the following manner. The following explanation will be made for the example in which the VTR is used as a signal transmitting VTR. A manner in which a tape part to be edited is designated in the following manner: When an editing start point is designated by the operation part 2, the counter 15 is reset at a value "0". Following this, the system controller 3 has the tape moved for designating an editing end point. Then, a video signal reproduced by the rotary head 15 is output to the output terminal for the monitor through the video signal reproduction processing circuit 20, the switch 21 and the composition circuit 22. Further, a signal reproduced by the fixed head 11 is supplied to a demodulation circuit 113 via one side B of the switch 10 and a reproduction amplifier 112. By this, the synchronizing code, the time code, etc. mentioned in the foregoing are demodulated. These codes are decoded by a decoder 114 into the original time data. The time data thus obtained is supplied to the counter 115. The counter 115 counts up every time the time data is obtained. However, it counts down in a case where the tape 1 is allowed to travel in the reverse direction.

After that, when the operator designates the editing end point by manually operating the operation part 2 while watching the picture plane of the monitor, the counted value of the counter 15 is stored by a memory 16. This counted value, of course, corresponds to a time interval between the editing start and end points.

After the editing start and end points are thus designated, an actual editing action, the pre-confirming action and the post-confirming action are performed as follows: The tape 1 is first moved to a point immediately before the editing start point in the manner as mentioned in the foregoing. The tape is allowed to travel. When the tape 1 reaches a desired recording start point, the counter 115 begins to count the number of times for which the time codes are read out as mentioned in the foregoing. A computing circuit 17 is arranged to divide the counted value of the counter 115 by the value which is stored by the memory 16 which corresponds to the time interval between the editing start and end points. At that time, the counted value of the counter 115 corresponds to a time interval from the editing start point to the currently reproducing (or recording) point. As a result, a value output from the computing circuit 17 indicates the ratio of the current range of progress to the whole editing range. In other words, the computing circuit 17 produces data indicating the state of progress of the editing action. This data is displayed by a display device 18 and is also supplied to a character generator 19. The character generator 19 then produces a character signal which corresponds to the data. Then, the character signal is multiplexed by the composition circuit 22 with the video signal being monitored. Further, the display device 18 and the character generator 19 are arranged to be controlled by the system controller 3 in such a way as to operate only for the editing, pre-confirming and post-confirming actions.

Figure 3A:
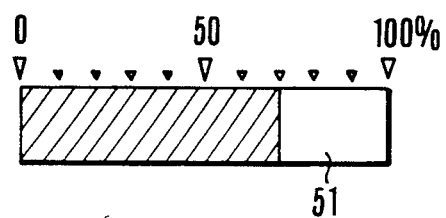
FIGS. 3(A) and 3(B) show by way of example the displays indicating the state of tape travel caused by the VTR of FIG. 1.
Figure 3B:
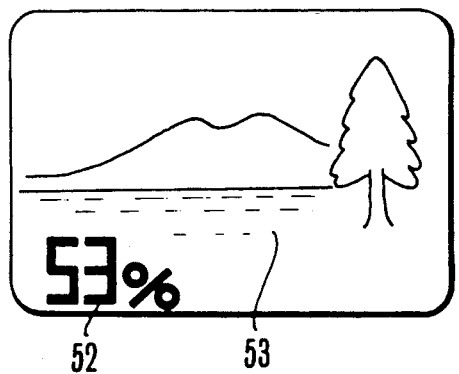

FIGS. 3(A) and 3(B) show the displays of data indicating the state or degree of progress of the editing action. FIG. 3(A) shows by way of example a display to be made through the display device 18 and FIG. 3(B) a display to be made through the character generator 19.

Referring to FIG. 3(A), a liquid crystal display plate 51 is mounted on the body of the apparatus (VTR). The progress rate of editing is displayed in percentage. In the case of FIG. 3(B), a character display 52 likewise indicates the progress of editing. The display is superimposed on the monitor picture plane 53.

In accordance with the arrangement of this embodiment, the state of progress of editing work can be instantly grasped by means of counter 115 and the computing circuit 17 which are relatively simple circuits. Further, in the embodiment described, the decoder 114 for the time code can be emitted, since a similar function can be accomplished by using only a synchronizing data extracting circuit. However, since the time code is often used also for other purposes, the time code decoder is indispensable in many cases. Therefore, the above-stated decoder 114 is included not only for the purpose of this invention.

Figure 4:
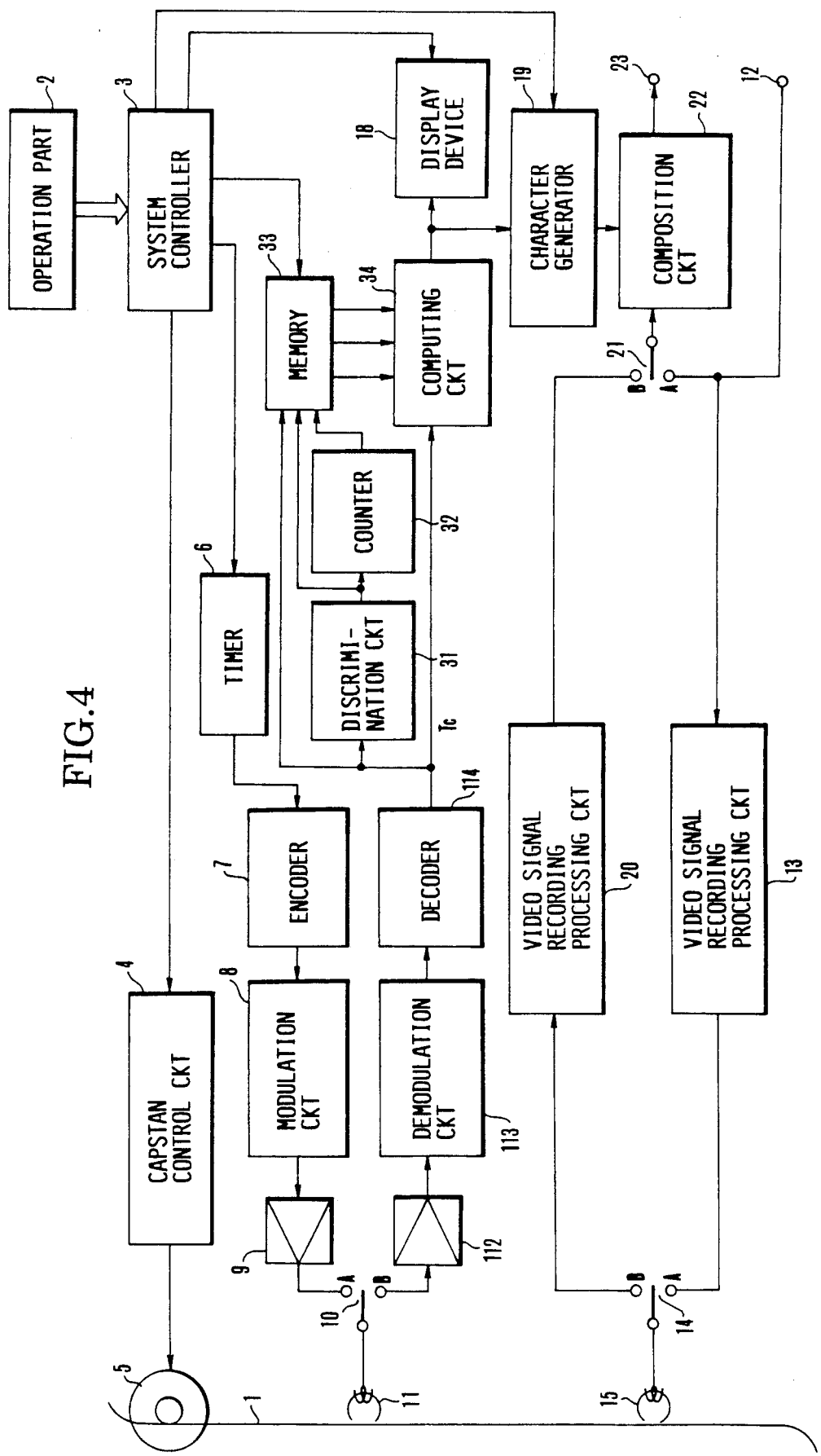
FIG. 4 shows in outline the arrangement of a VTR arranged as another embodiment of the invention.

FIG. 4 shows in outline the arrangement of a VTR which is arranged also according to this invention as another (second) embodiment thereof. The same component parts as those of FIG. 1 are indicated by the same reference numerals and the details of them are omitted from the following description. The second embodiment differs from the (first) embodiment shown in FIG. 1 in the manner in which the time code is processed in designating the editing start and end points and during the processes of the editing and confirming actions while the video signal and the time code are recorded in exactly the same manner as in the case of the first embodiment.

When the editing start point is designated by means of the operation part 2, the decoder 114 decodes time information Tc indicated by the time code which is reproduced at that time. The decoded time information Tc is stored as editing start point information Ts at the address DT-0 of a memory 33. The tape 1 is allowed to travel. A discrimination circuit 31 detects any inconsecutive point between the time codes being reproduced and produces a pulse upon detection of the point. In response to this pulse, a difference DL(0) between the editing start point information Ts and time information Tc' indicated by the time code preceding the detection of the inconsecutive point is stored at the address DL-0 of the memory 33. Then, time information Tc obtained after the detection of the inconsecutiveness is stored at another address DT-1 of the memory 33. A counter 32 counts up the number of pulses output from the discrimination circuit 31 for controlling the writing address of the memory 33 with its counted value.

For example, assuming that the i-th occurrence (i: a natural number) of the inconsecutiveness is detected by the circuit 31, data indicative of a difference between the time information Tc' obtained before the occurrence of inconsecutiveness and data stored at an address DT-(i-1) of the memory 33 is stored at an address DL-(i-1) of the memory 33. Then, time information Tc obtained after the occurrence of inconsecutiveness is stored at the address DT-i of the memory 33. With this action repeated, editing end point information Te is eventually stored at an address DT-(n+1) of the memory 33. Information values DL(0) through DL(n) indicating time intervals between, inconsecutive points are thus stored at the addresses DL-0 through DL-n of the memory 33. When the editing end point is designated, a total sum $$\sum_{i=0 \sim n} DL(i)$$

of the values DL(0) to DL(n) are stored at an address DL-(n+1) of the memory 33. The total sum $$\sum_{i=0 \sim n} DL(i),$$

that is, DL(n+1), represents a time interval from an editing start point to an editing end point. FIG. 8 shows data stored at each address of the memory 33.

Next, description of editing and confirming actions is as follows: The discrimination circuit 31 detects the inconsecutiveness of the time information Tc as mentioned above. The counted value of the counter 32 is incremented every time the detection is made by the circuit 31. With the counted value of the counter 32 assumed to be "i", the data values DL(0) to DL(i-1) and DT(i) are read out from the memory 33 in accordance with the counted value "i". Meanwhile, the data value DL(n+1) is constantly read out. A computing circuit 34 computes a value X which indicates the state or degree of progress of editing and is obtained from these data and current time information Tc according to the following formula:

$$X = \{Tc - DT(i) + DL(0) + \cdots + DL(i-1)\}/DL(n+1)$$

The degree of progress of the editing work which is thus obtained is displayed on the display device 18 and on the monitor picture plane in the form of characters in the same manner as in the case of the first embodiment.

In accordance with the arrangement of the second embodiment described, the data processing operation is performed rather in a complex manner. However, since the value or degree of progress of an automatic editing action, etc. is computed from values indicating the absolute addresses of the time codes, etc. read out, the operation is not easily affected by a disturbance such as omitted or duplicate time-code reading. Another advantage of the second embodiment lies in that the arrangement precludes the possibility of propagation of any reading error.

Figure 5:
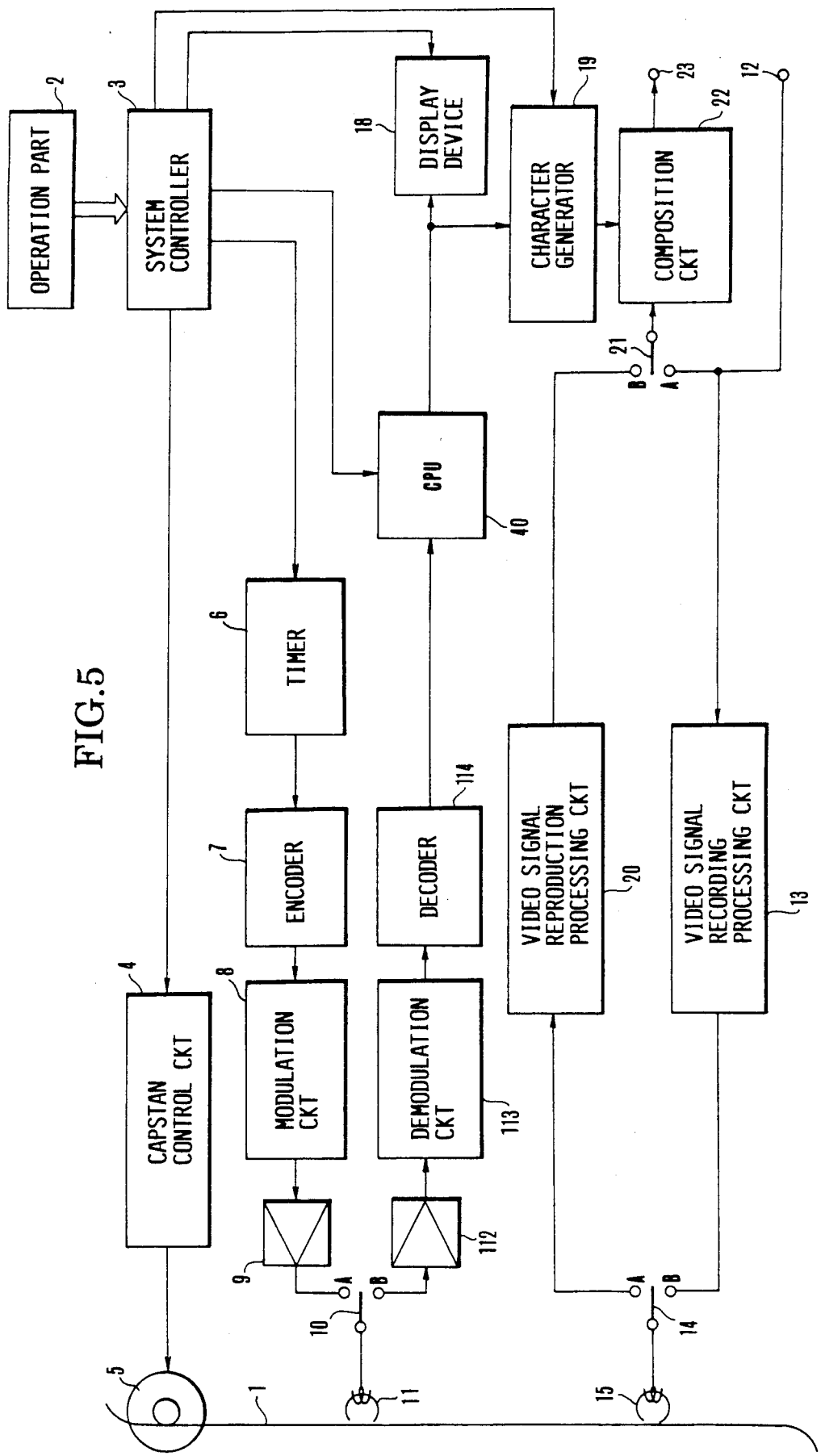
FIG. 5 shows in outline the arrangement of a VTR arranged as a further embodiment of the invention.
Figure 6:
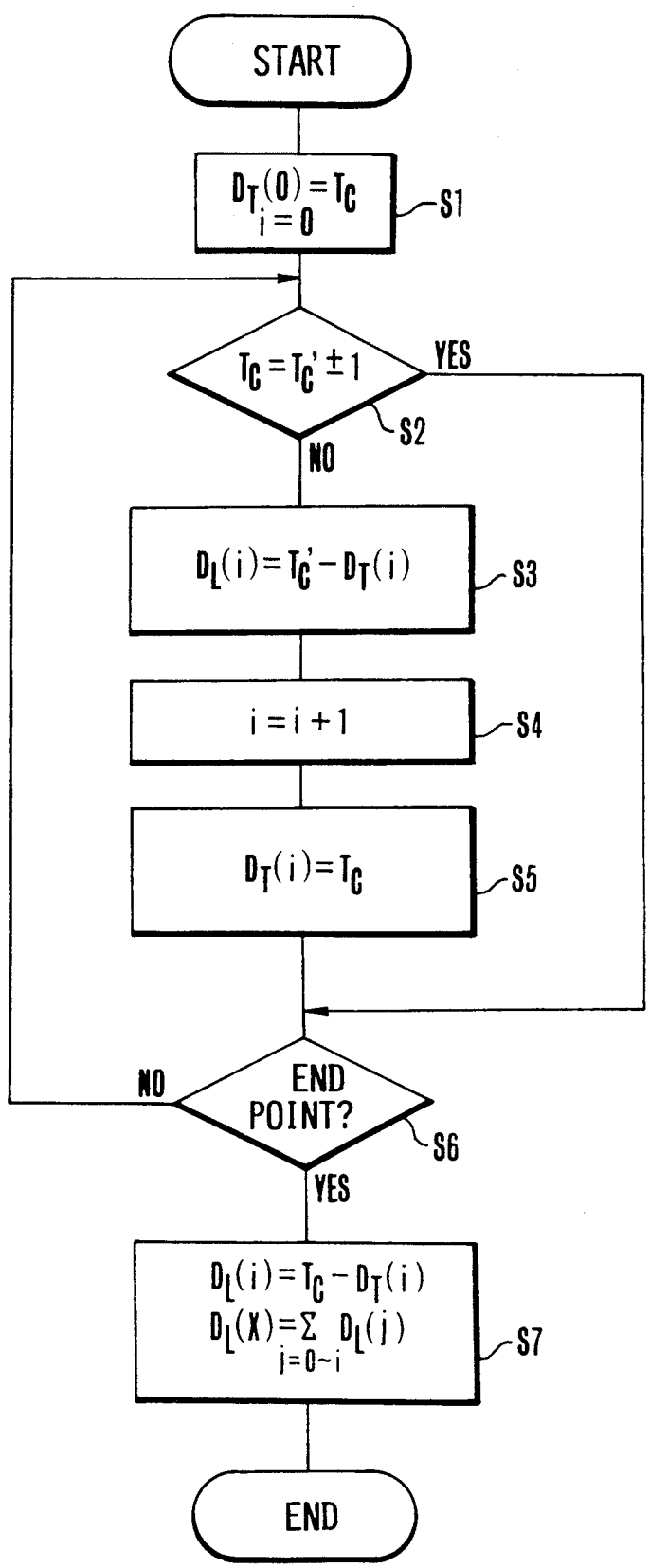
FIGS. 6 and 7 are flow charts showing the operation of a CPU of the VTR shown in FIG. 5.

FIG. 5 shows in outline the arrangement of a VTR which is arranged as a further (or third) embodiment of this invention. In the third embodiment, the time code processing operation which is performed by means of the discrimination circuit 31, the counter 32, the memory 33 and the computing circuit 34 in the case of the second embodiment shown in FIG. 4 is arranged to be accomplished by means of a CPU in a software manner. The CPU 40 is arranged to operate as described below with reference to FIGS. 6 and 7 which are flow charts:

FIG. 6 shows the operation of the CPU 40 performed when the editing start and end points are designated. With the editing start point designated by means of the operation part 2, time information Tc indicated by the time code obtained at that point of time is set for the data value DT(0) and the value "i" is set at "0" (a step S1). The data value DT(0) represents time information about the editing start point.

At a step S2: A check is made to see if the time codes have become inconsecutive while the tape 1 is moved. The time code is determined to be consecutive if the current time information Tc is changed by +1 or -1 from the immediately preceding time information Tc'. If not, the time code is determined to have become inconsecutive. In the former case, the flow of operation proceeds to a step S6. In the latter case, the flow of operation proceeds to a step S3. At the step S3: A value Tc'-DT(i) is set for the data value DL(i). Then, the data value DL(i) comes to represent a time interval for which the time information is consecutive before the occurrence of the inconsecutive point. At a step S4: The data "i" is set at a value "i+1". After that, the flow comes to a step S5 to set for the data value DT(i) the time information Tc obtained after detection of the inconsecutive point. These steps of operation are repeated every time an inconsecutive point is detected.

At a step S6: When the end point of editing is designated, a value Tc-DT(i) obtained from the current time information Tc is set for the data value DL(i). At a step S7: A total sum of values DT(0) to DT(i) is set for the data value DL(x). In other words, the value of a time interval from the editing start point to the editing end point is stored at the address DL(x).

Figure 7:
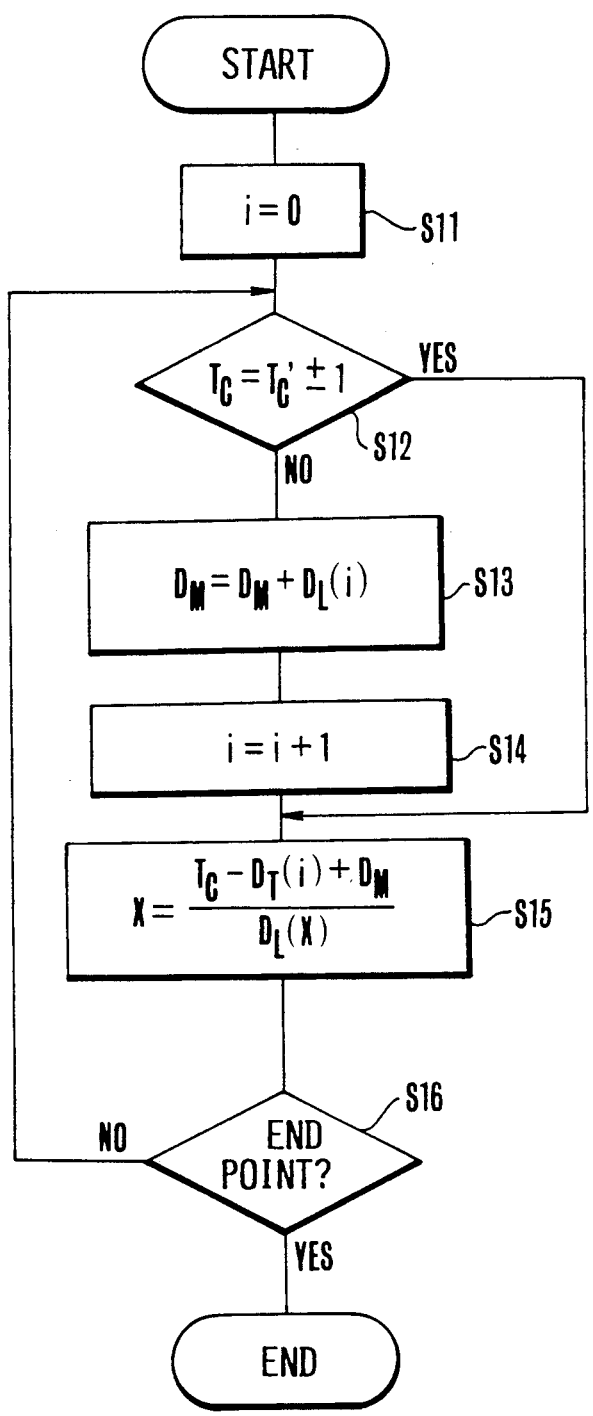

FIG. 7 shows in a flow chart the operation of the CPU 40 to be performed in editing or in confirming. At a step S11: When the editing process begins, the data "i" is set at "0". After this, data X indicative of the progress state of editing is constantly computed through a step S15. The data X is obtained by the following formula:

$$X = \frac{Tc - DT(i) + DM}{DL(x)}$$

where Tc represents the current time information; DT(i) represents time information obtained immediately after an inconsecutive point detected latest; DM represents information on a time interval from the editing start point to the latest inconsecutive point; and DL(x) represents information on a time interval from the editing start point to the editing end point as mentioned in the foregoing.

When an inconsecutive point is detected at a step S12, the flow comes to a step S13. At the step S13: Data value DM is set at a value DM+DL(i), wherein DL(i) represents a time interval during which the time information is consecutively obtained before an i-th inconsecutive point is detected; and DM represents a total sum of data value DL(0) to DL(i). At a step S14: The data "i" is changed to a value "i+1". After the step S14, the flow comes to the above-stated step S15.

During the editing process, the data X is displayed, like in the case of the second embodiment shown in FIG. 4, at the display device 18 and also on the picture plane of a monitor in the form of superimposed characters.

As apparent from the foregoing description, the VTR of FIG. 5 is also capable of giving the same advantageous effect as in the case of the VTR of FIG. 4.

What is claimed is:

1. An information signal reproducing apparatus, comprising:
   a) reproducing means for reproducing an information signal from a tape-shaped recording medium;
   b) designating means for designating first and second positions of said tape-shaped recording medium;
   c) first means for generating first information which indicates a time interval between said first and second positions;
   d) second means for generating second information which indicates a time interval between a reproducing position of said reproducing means on said tape-shaped recording medium and said first position;
   e) third means for computing third information which indicates a ratio between said first information and said second information; and
   f) display means for displaying said third information.

2. An apparatus according to claim 1, wherein said second means includes time-code reproducing means for reproducing from said tape-shaped recording medium time codes which indicate time information, and forming means for forming said second information on the basis of said time codes reproduced by said time-code reproducing means.

3. An apparatus according to claim 2, wherein said forming means includes a counter for counting the number of times said time code is reproduced.

4. An apparatus according to claim 2, wherein said forming means includes computing means for computing a difference between the time information obtained according to said time codes and time information obtained according to said first position.

5. An apparatus according to claim 1, wherein said display means is arranged to display said third information in percentage.

6. An apparatus according to claim 1, wherein said information signal is a video signal, and wherein said display means includes means for generating a character signal relating to said third information and a composition circuit for combining said character signal with the video signal reproduced by said reproducing means.

7. An information signal reproducing apparatus, comprising:
- a) reproducing means for reproducing an information signal from a tape-shaped recording medium;
- b) time information reproducing means for reproducing time information recorded on said tape-shaped recording medium;
- c) detecting means for detecting inconsecutive points of said time information reproduced by said time information reproducing means;
- d) extracting means for extracting, in response to detection of each of said inconsecutive points by said detecting means, parts of said time information reproduced immediately before and immediately after each of said inconsecutive points;
- e) first means for computing first information indicative of a difference between the part of said time information reproduced immediately before a first inconsecutive point and a part of time information reproduced immediately after a second inconsecutive point detected by said detecting means adjoining said first inconsecutive point;
- f) second means for computing second information indicative of a difference between the part of said time information reproduced immediately after said first inconsecutive point and a part of time information currently reproduced; and
- g) third means for obtaining third information by adding together said first information and said second information.

8. An information signal reproducing apparatus, comprising:
- a) reproducing means for reproducing an information signal from a tape-shaped recording medium;
- b) time information reproducing means for reproducing time information recorded on said tape-shaped recording medium;
- c) first extracting means for designating a first position of said tape-shaped recording medium and for extracting time information according to said first position;
- d) detecting means for detecting inconsecutive points of said time information reproduced by said time information reproducing means;
- e) second extracting means for extracting, in response to detection by said detecting means of each of said inconsecutive points, parts of said time information reproduced immediately before and immediately after each of said inconsecutive points;
- f) first computing means for computing first information indicative of a difference between the part of said time information reproduced immediately before an inconsecutive point and said time information according to said first position;
- g) second computing means for computing second information indicative of a difference between the part of said time information reproduced immediately after said inconsecutive point and a part of time information currently reproduced; and
- h) third computing means for obtaining third information by adding together said first information and said second information.

9. An apparatus according to claim 8, further comprising:
- third extracting means for designating a second position of said tape-shaped recording medium and for extracting time information according to said second position; and
- fourth computing means for computing a fourth information indicative of a difference between said time information according to said first position and said time information according to said second position.

10. An apparatus according to claim 9, further comprising:
- fifth computing means for computing fifth information indicative of a ratio between said third information and said fourth information; and
- display means for displaying said fifth information.

* * * * *